(12) United States Patent
Moore (10) Patent No.: US 9,120,233 B2
(45) Date of Patent: Sep. 1, 2015

(54) NON-CONTACT OPTICAL DISTANCE AND TACTILE SENSING SYSTEM AND METHOD (75) Inventor: Douglas A. Moore, Alameda, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 412 days.

(21) Appl. No.: 13/485,691

(22) Filed: May 31, 2012

(65) Prior Publication Data

US 2013/0325181 A1 Dec. 5, 2013

(51) Int. Cl.
*B25J 13/08* (2006.01)
*B25J 15/10* (2006.01)

(52) U.S. Cl.
CPC ............... *B25J 13/08* (2013.01); *B25J 13/084* (2013.01); *B25J 13/086* (2013.01); *B25J 15/10* (2013.01); *Y10S 901/31* (2013.01); *Y10S 901/33* (2013.01); *Y10S 901/35* (2013.01); *Y10S 901/46* (2013.01)

(58) Field of Classification Search
CPC ............ B25J 13/08; B25J 19/04; B25J 19/02; B25J 15/08; B25J 13/084; B25J 13/086; B25J 15/0009; B25J 9/1005; B25J 13/081; B25J 15/10; G01V 11/00; G01L 5/226; G01L 5/228; Y10S 294/907; F16P 3/14
See application file for complete search history.

(56) References Cited

U.S. PATENT DOCUMENTS

| | | | |
|---|---|---|---|
| 4,541,771 A | 9/1985 | Beni et al. | |
| 4,579,380 A | 4/1986 | Zaremsky et al. | |
| 4,602,163 A | 7/1986 | Pryor | |
| 4,675,502 A * | 6/1987 | Haefner et al. | 219/124.34 |
| 4,718,023 A | 1/1988 | Arora | |
| 4,747,458 A | 5/1988 | Andre et al. | |
| 4,783,107 A * | 11/1988 | Parker et al. | 294/213 |
| 4,809,191 A | 2/1989 | Domeier et al. | |
| 4,821,206 A * | 4/1989 | Arora | 700/258 |
| 4,972,074 A | 11/1990 | Wright | |
| 4,980,626 A * | 12/1990 | Hess et al. | 318/568.16 |

(Continued)

FOREIGN PATENT DOCUMENTS

| | | |
|---|---|---|
| EP | 0236611 | 8/1987 |
| JP | 3142186 | 6/1991 |
| JP | 6031666 | 2/1994 |

OTHER PUBLICATIONS scale.pdf (http://www.merriam-webster.com/dictionary/scale, Scale—Definition and More from the Free Merriam-Webster Dictionary, Apr. 23, 2014,pp. 1-9).*

(Continued)

*Primary Examiner* — Bao Long T Nguyen
(74) *Attorney, Agent, or Firm* — Snell & Wilmer LLP (57) ABSTRACT

The systems and methods are directed to mechanical arms and manipulators, and more particularly, to optical distance sensors in use for approach, grasping and manipulation. The system may include a manipulator having an arm and a multi fingered end-effector coupled to the distal end of the arm. The end-effector may include an optical proximity sensor configured to detect the distance to an object prior to contact with the object. The end-effector may include an optical proximity sensor configured detect a measurement of force applied to the object by the manipulator post contact with the object. The measurement of force may be a range of force measurements including a minimum, a maximum and a measurement between or within the minimum and the maximum.

16 Claims, 5 Drawing Sheets

(56) References Cited

U.S. PATENT DOCUMENTS

| | | | |
|---|---|---|---|
| 5,802,201 A | 9/1998 | Nayar et al. | |
| 6,994,387 B1* | 2/2006 | Ragner et al. | 294/86.4 |
| 7,161,322 B2* | 1/2007 | Wang et al. | 318/568.2 |
| 7,973,274 B2 | 7/2011 | Kuniyoshi et al. | |
| 8,606,398 B2* | 12/2013 | Eakins et al. | 700/245 |
| 8,662,552 B2* | 3/2014 | Torres-Jara | 294/111 |
| 2008/0021597 A1* | 1/2008 | Merte et al. | 700/255 |
| 2009/0033341 A1 | 2/2009 | Son et al. | |
| 2009/0055022 A1* | 2/2009 | Casey et al. | 700/258 |
| 2009/0204260 A1* | 8/2009 | Bryne et al. | 700/259 |
| 2009/0285664 A1 | 11/2009 | Kim et al. | |
| 2010/0068024 A1* | 3/2010 | Agens | 414/729 |
| 2010/0292842 A1 | 11/2010 | Takahashi | |
| 2011/0033254 A1* | 2/2011 | Abrams | 408/1 R |
| 2011/0067504 A1* | 3/2011 | Koyama et al. | 73/862.381 |
| 2011/0166704 A1* | 7/2011 | Hashimoto | 700/250 |
| 2011/0223001 A1* | 9/2011 | Martinez et al. | 414/730 |
| 2012/0101508 A1* | 4/2012 | Choi et al. | 606/130 |

OTHER PUBLICATIONS

Park, et al.; "Fingertip Force Control with Embedded Fiber Bragg Grating Sensors"; 6 pages; No date.

* cited by examiner

NON-CONTACT OPTICAL DISTANCE AND TACTILE SENSING SYSTEM AND METHOD

FIELD

The present disclosure relates to robotic manipulators, and more particularly, to optical distance sensors in use for approach, grasping and manipulation.

BACKGROUND

In general, in robotics, a manipulator is a device used to manipulate materials without direct human contact. Manipulator applications were originally for dealing with radioactive or biohazardous materials or they were used in inaccessible places. In more recent developments they have been used in applications such as robotically-assisted surgery and in space. A manipulator may be an arm-like mechanism that consists of a series of segments, usually slide, pivoted or jointed, which grasp and move objects with a number of degrees of freedom.

Currently, systems comprise tactile sensors which require contact with the manipulator before sensing the object. These tactile sensors have some sort of contact sensing typically covered by compliant 'skin'. This form of sensing is currently being explored and developed. These tactile sensors require very cautious slow movement when the location of the object contains some uncertainty. Likewise, there are optical distance sensors that are used for obstacle avoidance in robot navigation, but not specifically for the use of grasping and manipulation. Currently, grasping and manipulation is one of the most difficult robotic challenges. Improving the ability for grasping is important for the advancement of robotic applications.

SUMMARY

The above needs are successfully met via the disclosed system and method. The present disclosure is generally directed to robotic manipulators, and more particularly, to optical distance sensors in use for approach, grasping and manipulation. In various embodiments, the system may include a manipulator having an arm and a multi fingered end-effector coupled to the distal end of the arm. The end-effector may include an optical proximity sensor configured to detect the distance to an object prior to contact with the object. The end-effector may include an optical proximity sensor configured to detect a measurement of force applied to the object by the manipulator post contact with the object. The measurement of force may be a range of force measurements including a minimum, a maximum and a measurement within the minimum and the maximum. This range of force measurements may include contact with the object, lack of contact with the object and a variety of force measurements in between. The system may further comprise an arm having proximity sensors configured to aid in movement and object avoidance. The arm may comprise a plurality of arm segments configured to flex and rotate.

In various embodiments, a tactile sensor is coupled to the end-effector, such as a contact surface (e.g. finger) of the end-effector. The optical proximity sensor may be configured to operate through a channel and through-hole in the surface of the manipulator.

In various embodiments, a contact surface of the end-effector is configured to compress as force is applied to the object. Moreover, in response to the distance between the contact surface and the optical proximity sensor being reduced, a measurement of force is made and/or calculated. A single light source generator of the optical proximity sensor may comprise a plurality of receivers. The end-effector and its elements may be configured to a desired orientation based on the measured surface features of the object by the optical proximity sensor. The end-effector may be configured to mirror and/or trace a portion of the measured surface features of the object at a dynamically adjustable range.

The manipulator may be coupled to a controller. The controller may determine the optimal location to make contact with the object based on the data from the optical proximity sensor. The manipulator may be coupled to a vehicle. The direction of sensing of the optical proximity sensor may be dynamically positioned independent from the position of the manipulator. The optical proximity sensor may be configured to sweep in a desired range of angles from a surface of the manipulator. The optical proximity sensor range may be dynamically adjusted to a dynamically scalable range. In some embodiments, the direction of sensing by the optical proximity sensor is configured to be held steady, independent of the motion of the manipulator. An optical proximity sensor may be housed on any portion of the end-effector such as on at least one of the palm, wrist, backhand, finger, joint or fingertip of the end-effector.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

DETAILED DESCRIPTION

In the following detailed description, numerous specific details are set forth to provide an understanding of the present disclosure. It will be apparent, however, to one of ordinarily skilled in the art that elements of the present disclosure may be practiced without some of these specific details. In other instances, well-known structures and techniques have not been shown in detail to avoid unnecessarily obscuring the present disclosure.

The present disclosure is generally directed to mechanical arms 120 and manipulators 105, and more particularly, to optical distance sensors 350 in use for approach, grasping and manipulation. A mechanical arm 120 is robotic, usually programmable, with similar functions to a human arm. The links of such a manipulator 105 are connected by joints allowing rotational motion (such as in an articulated robot) and/or translational (linear) displacement and combinations thereof. The links of the manipulator 105 can be considered to form a kinematic chain. The distal end of the kinematic chain of the manipulator 105 is often called the end-effector 200 and it is similar to the human hand. The end-effector 200 can be designed to perform any desired task, such as welding, gripping, spinning, etc., depending on the application. The manipulators 105 and/or mechanical arm 120 can be autonomous or controlled manually and can be used to perform a variety of tasks with great accuracy. The manipulators 105 and/or mechanical arm 120 can be fixed or mobile (i.e., wheeled) and can be designed for any suitable application.

Figure 4:
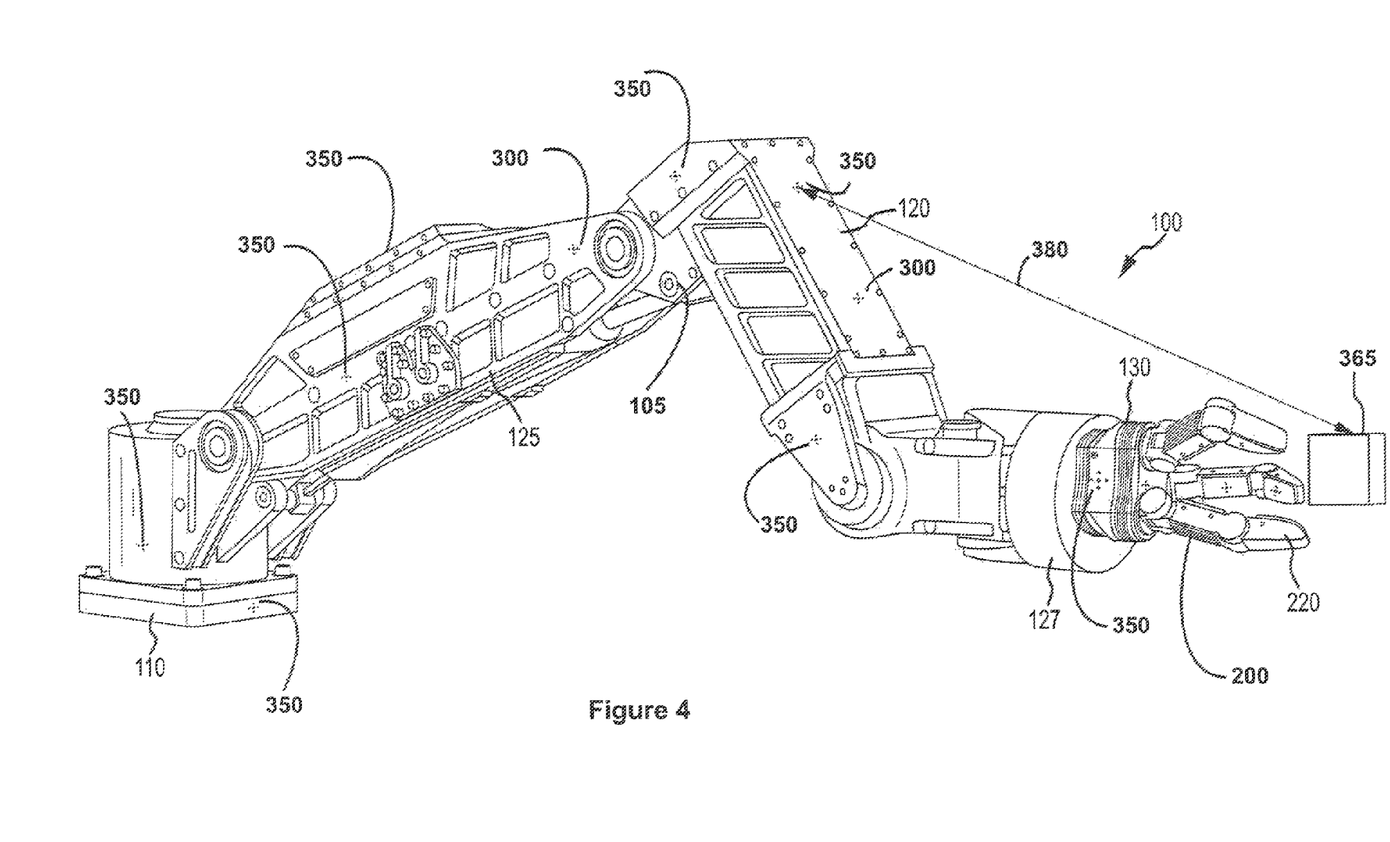
FIG. 4 depicts another exemplary embodiment of a manipulator comprising an arm.

In various embodiments, the system 100 includes sensors 300 configured for aiding in grasping and manipulation tasks. This may allow for improved grasping techniques, more autonomous grasping, and improved safety in gasping. In various embodiments, and with reference to FIGS. 1 and 4, the system 100 comprises a base 110, a manipulator arm 120, comprising one or more rotating/flexing segments, such as a first segment 125 coupled to the base 110 and a second segment 127 coupled to the wrist 130, and an end-effector 200. The end-effector 200 may comprise a wrist 130, a palm 140, and one or more pincher(s)/finger(s) 220. The end-effector 200 may comprise any suitable number of fingers 220. Each finger 220 may comprise joints 230, 235 which may flex and/or rotate. In an embodiment, the end-effector 200 comprises 3 fingers 220. In another embodiment, the end-effector 200 comprises 2 fingers 220. The fingers 220 generally comprise a surface configured to make contact with an object, such as a contact surface 405 of finger 220 of FIG. 2A. The surface of the finger 220 may be textured and/or comprise surface features to aid in grasping objects.

In various embodiments, the base 110 may comprise a fixed surface which is semi-permanent. In various embodiments, the base 110 may comprise a movable surface, such as a vehicle. In various embodiments, the base 100 may comprise an autonomous movable robot. In various embodiments, the base 110 may comprise a controlled movable robot.

In an embodiment, a sensor 300 is configured to allow for sensing of an object to be grasped before physical contact with the object and also to allow for sensing of an object once contact is made. In an embodiment, the sensor 300 is configured to prevent unwanted collisions on target approach and aid in pre-grasp configurations for aligning the manipulator 105 and for assisting with manipulator 105 approach. An alarm may be triggered and/or movement halted and/or reversed based on an object or entity being sensed by the sensor 300 in any suitable location on the manipulator 105 and/or associated manipulator 105 elements. These sensors 300 may assist in moving the base 110, the manipulator arm 120, and/or end-effector 200.

In an exemplary embodiment, the sensor 350 is an optical proximity sensor. This optical sensor 350 may be an infrared (IR) sensor, laser, photo sensor, and/or the like. The optical proximity sensor 350 may assist with navigation, collision avoidance, proximity detection and a substantially real-time scalable force calculation.

In an embodiment, the optical proximity sensor 350 comprises a light source, and a sensor that detects the light, such as reflected light. The supplied light source may be "tailored" for the light sensor system (sensor 350). For instance, the light source may generate light of a frequency that the sensor 350 is configured to detect, and that is not likely to be generated by other nearby sources. The supplied light may be infra-red light. In various embodiments, the supplied light may be pulsed on and off at a fixed frequency. The sensor 350 circuit is designed so that light that is not pulsing at this frequency is rejected. The light sensor in the sensor 350 may be a semiconductor device such as a photodiode, which generates a small current when light energy strikes it, a phototransistor or a photo-darlington that allows current to flow if light strikes it.

The sensors 300 may also comprise sensor control circuitry. For instance, the control circuitry may be configured to match the pulsing frequency of the transmitter with the light sensor. The transmitter and receiver may be housed in the same package, referred to as a retroflective or retroreflective sensor 300. They detect targets that reflect light back to the sensor 300. This retroreflective sensor 300 may be configured and focused to recognize targets within a specified distance range.

Figure 1:
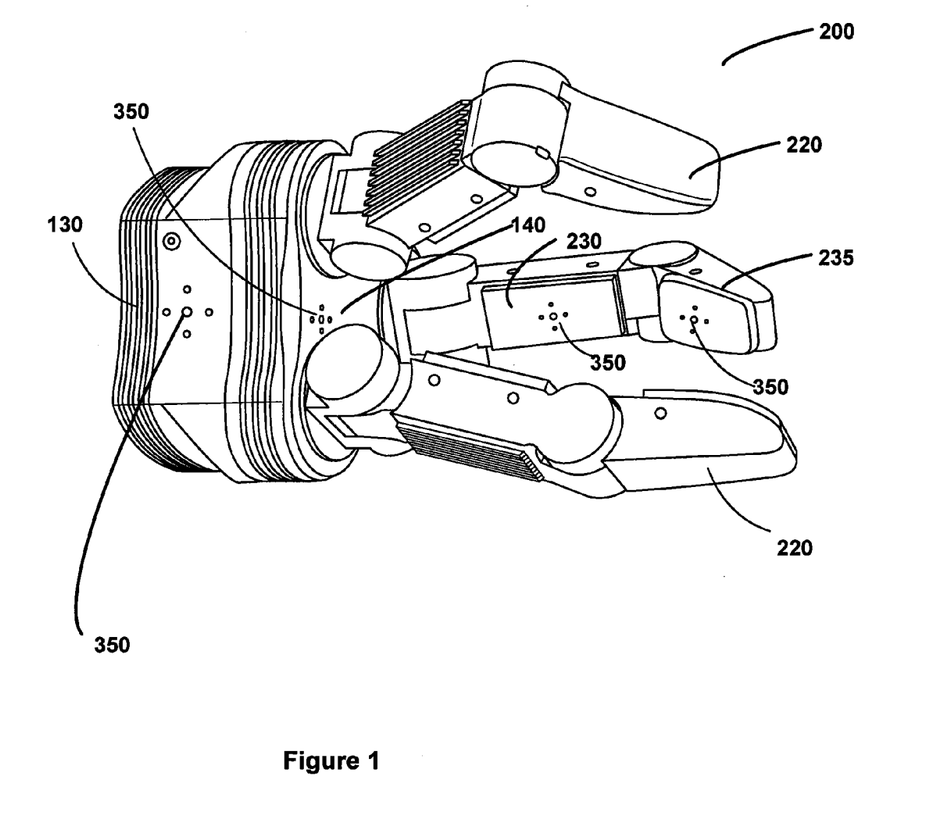
FIG. 1 depicts an end-effector of the manipulator according to various embodiments.

In various embodiments, the sensor 350 may comprise a single light source generator and multiple receivers so that a broader picture of the observed element may be made. As shown in FIG. 1, one light source generator is paired with 4 receivers. Moreover, for simplicity only one sensor 350 per joint is depicted in FIG. 1; however, it is contemplated that the entire surface may comprise sensors 300 (e.g. such as hundreds of sensors 300, 350, similar to pores in skin of a human, or hair follicles on the arm of a human). Theses sensors 350 may be configured to detect a distance 380 to the surface of an observed object 365, surface orientation of the observed object 365, overall reflectivity of the measured surface, and the observed object's 365 angular-reflectance profile.

One or more sensors 300 may be embedded in any portion of the end-effector 200 and/or manipulator arm 120, such as on a finger 220, joint segment 230,235, wrist 130, palm 140, proximate any external surface and/or combinations thereof. In various embodiments, the distance sensors 350 within the manipulator 105 may direct their line of sensing out from a contact surface of the manipulator 105 in any direction. In general, the optical proximity sensor 350 may direct its sensing beam orthogonal to a contact surface of the manipulator 105. In various embodiments, the orientation and pointing direction of the sensor 350 in the system 100 may be dynamically independently positioned (e.g., independent of the position/movement of manipulator 105 elements). For instance, prior to the manipulator 105 making contact and/or grasping an object, one or more sensors 350 may be directed to sweep in any desired range of angles and/or direction from a contact surface of the manipulator 105 to develop a robust understanding of the surface features of an object targeted. Additionally, as the various joints 230, 235, and fingers 220 of the manipulators 105 are moved, the direction of the beam of the proximity sensor 350 may be directed in a constant and/or desired position despite the sensor moving in three-dimensional space.

In various embodiments, focusing each sensor 350 may be dynamically adjusted to recognize targets within a dynamically scalable distance/range. This may assist, for example, with approaching an object from a large distance such as several feet. As the distance between the manipulator 105/ manipulator arm 120 and the object closes, the focusing of the optical proximity sensor 350 may be focused to a shorter distance with higher precision. This may reduce the computational needs of the system 100 as high precision may not be needed at greater distances. Additionally, the sensors 300 housed on the manipulator 105 and/or associated with the manipulator 105 may assist with dynamic collision prevention/avoidance and/or minimization. In an embodiment, the system 100 may alter the approach of the manipulator 105, to avoid an impact if possible. In an embodiment, the manipulator control system may take an evasive action to reduce the severity of contact if unavoidable. For instance, a glancing impact of the manipulator arm 120 may be less destructive than a head on collision. The manipulator control system may orient the manipulator arm 120 and/or the end-effector 200 in an orientation to reduce the damage caused by a collision. In an embodiment, the system 100 may close the fingers 220 of the end-effector 200 to reduce damage to their mechanics if impact is unavoidable.

In various embodiments, the proximity sensor 350 may be offset from a surface making contact with an object (e.g., contact surface). The surface making contact with an object and/or a portion thereof may compress or move towards the mounting surface of the sensor 350 as an object is grasped and additional force is applied to the object by the manipulator 105. This movement may be very slight. This compression may be in any direction or in a preconfigured direction. In this way, additional proximity sensing may be accomplished after contact with an object is made to determine force on a grasped object. This sensing of the sensor 350 may be in concert with other force sensing sensors 300, such as a tactile skin sensor 400. Stated another way, the optical proximity sensor 350 may continue to make proximity measurements after contact is made as a compressible and/or movable surface of the end-effector 200, such as a finger 220 surface, is moved closer to the fixed proximity sensor 350. This is in contrast to other proximity sensors which at best may only determine if an object is in continuous contact with the surface making contact with the object. In the system 100, the amount of displacement towards the offset, generally mounted in relief in the direction normal to the surface of the manipulator 105 contact surface of the proximity sensor 350, may allow for an enhanced grasping force determination. In an embodiment, based on the configuration and orientation of the surface making contact, a shear deflection may result, thus a determination of shear forces may be calculated by the sensors 350. For instance, the contact surfaces may be designed with various stiffness and flexibility properties in any desired direction.

In various embodiments, the contact surfaces may be made of hundreds of movable and/or compressible surfaces such that a better determination of the forces of the object making contact may be made. These compressible surfaces may further include a sensor 400. The contact surfaces may each individually pivot on an axis in any direction. The sensors 350 may be mounted in or at any angle relative to the plane of the contact surface to assist with this sheer force calculation. The contact surfaces may be configured to return to their original position as force on the object is reduced, for instance when the object is no longer in contact with the contact surfaces.

The skin sensor 400, (tactile sensors) may be an array of force sensing cells, i.e., sensels, configured to measure the spatial distribution and magnitude of forces perpendicular to the sensing area. Similar to sensors 350, these tactile sensors 400 may be configured to provide real-time pressure profiles on flat, curved, rigid or soft surfaces and can be used to improve the quality of industrial processes as well as of commercial products.

Additionally, the system 100 may comprise other sensors 300 working in concert with the proximity sensor(s) 350. For instance, in various embodiments, the system 100 may comprise a contact/force sensor 400 on any surface, such as on grasping/holding surfaces. The system 100 may measure the 6-axis forces and torques at the base of each individual finger 220. The system 100 may comprise finger 220 position sensors 300, particularly the position of the fingertips. The system 100 may measure the 6-axis forces and torques at the wrist 130. The system 100 may comprise a force and/or torque sensor between the end-effector 200 and the arm 120.

Figure 2A:
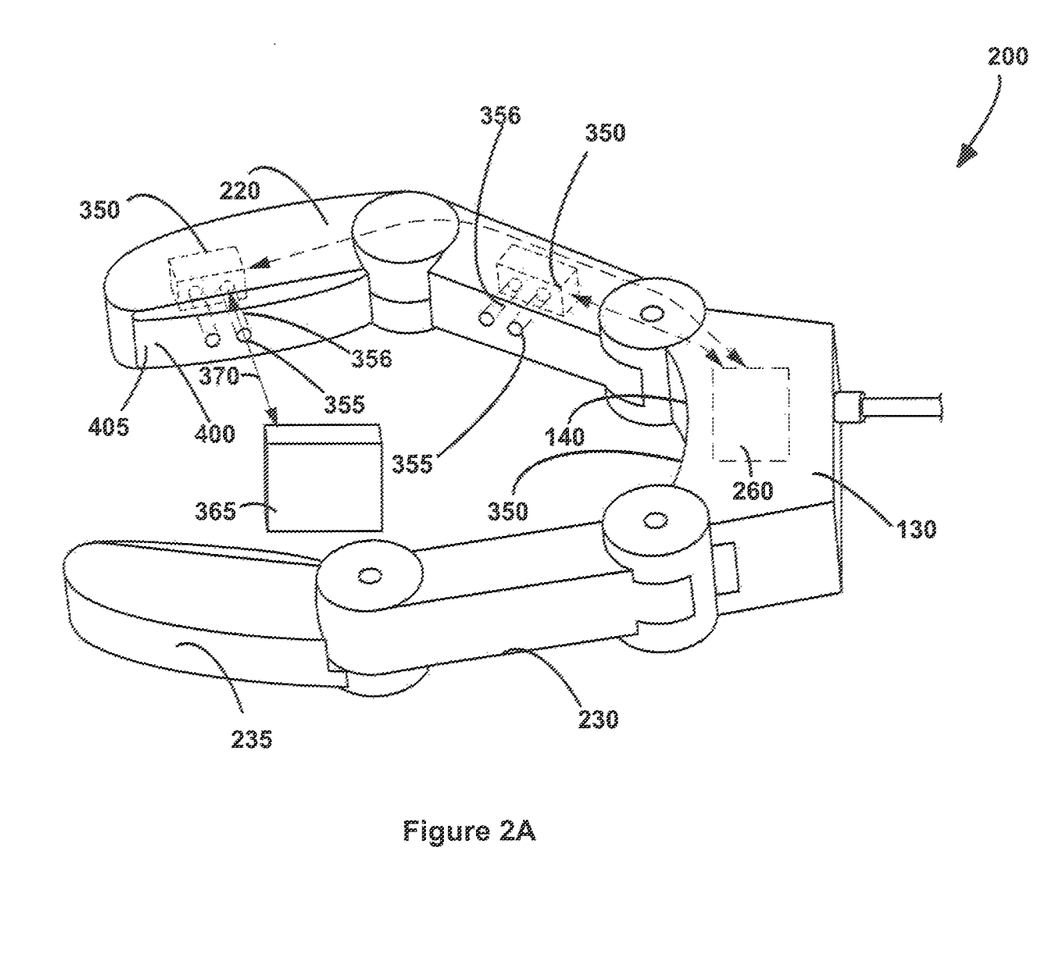
FIG. 2A depicts another exemplary embodiment of a manipulator.
Figure 2B:
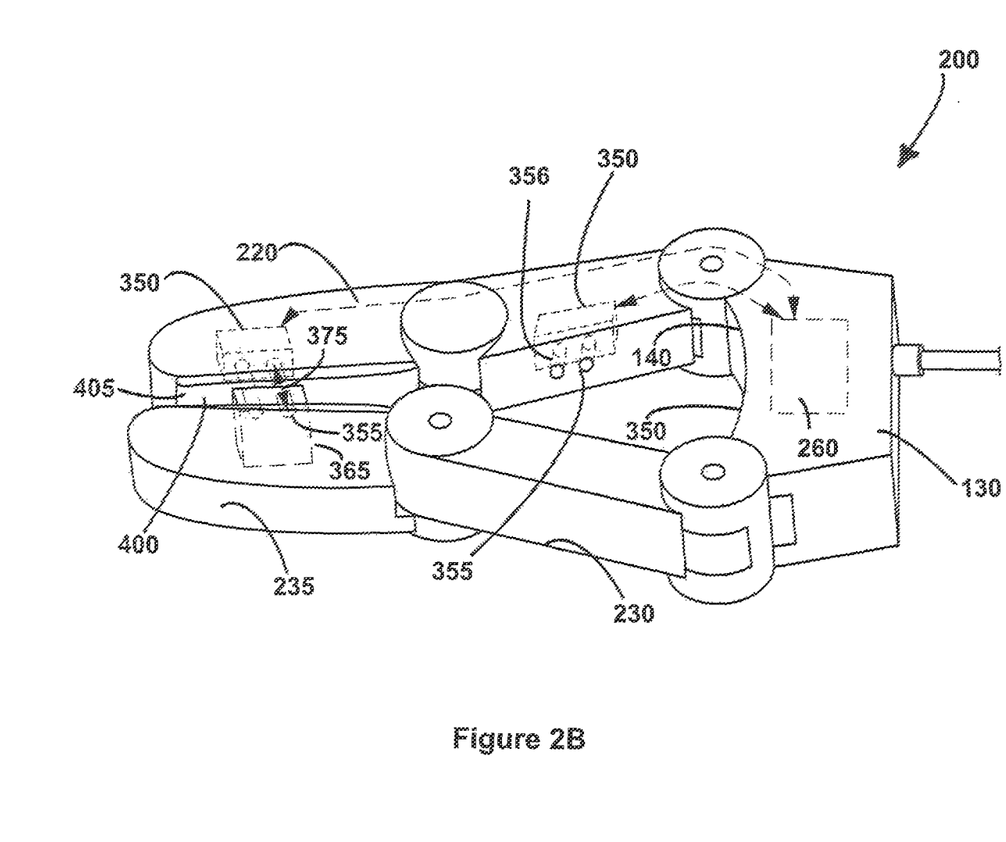
FIG. 2B depicts the manipulator of FIG. 2A gripping an object.

The sensor 350 may be embedded into the manipulator 105 and be configured to detect the distance 370 between the manipulator and a surface of an object 365 being measured. With reference to FIGS. 2A and 2B, the sensor 350 may operate down a channel 356 through one or more through holes 355 through the contact surface 405 of the manipulator 105.

The sensors 300 may be configured to communicate with a controller 260. The controller 260 may be housed on/in the manipulator 105, and/or external to the manipulator 105. The controller 260 may be in wired or wireless communication with the sensors 300. The sensors 300 may provide data feedback for the distance to the nearest object in the path of sensing to the manipulator 105. This distance information may be of any suitable scale. The controller 260 may be also configured to receive data regarding the precise positioning of all manipulator 105 elements. Prior to making a distance calculation of an object under review, the current position of each manipulator 105 element may be made. The data may be interpreted by the controller 260 to configure the manipulator 105 elements to a desired shape and orientation based on the surface features of the object to be grasped and/or investigated prior to making contact with the object. The manipulator 105 may be configured to follow the contours of an object without having to touch that object at a pre-selected distance. In various embodiments, the manipulator 105 may be configured to grasp items with a handle, such as by reaching through the handle without moving the object prior to reaching through the object. The manipulator 105 may be configured to other algorithmic alternatives, such as a predetermined or adaptive shape and/or configuration based on distance sensing corresponding to any defined grasping method.

In operation, the manipulator 105 may be given the instruction to investigate an object. The manipulator 105 may search for an object. Using the sensor 350, the manipulator 105 may locate the object. Using the sensor 350, the manipulator 105 may approach the object. This approach may be by moving the manipulator 105 in a fixed position towards the object, such as using mechanized travel, such as motorized wheeled movement. This approach may be movement of the manipulator 105, the arm 120 and/or the end-effector 200 elements. Data from the sensors 350 may be transmitted to the controller 260. The sensed data may be combined by the controller 260 to establish bounds of the surface features of an object under inspection. The sensors 300, such as sensors 350, in the arm 120 and/or the wrist 130, may detect the clearance of the approach to the object to be inspected. This sensing may prevent collisions while moving the manipulator 105. For instance, a scenario may occur where a manipulator 105 may be operated through an opening into a space with unknown characteristics. These sensors 350 may assist moving the manipulator 105 elements without making unwanted contact with any surface. An object for inspection/to be grasped may be located within the space with unknown characteristics.

Figure 3:
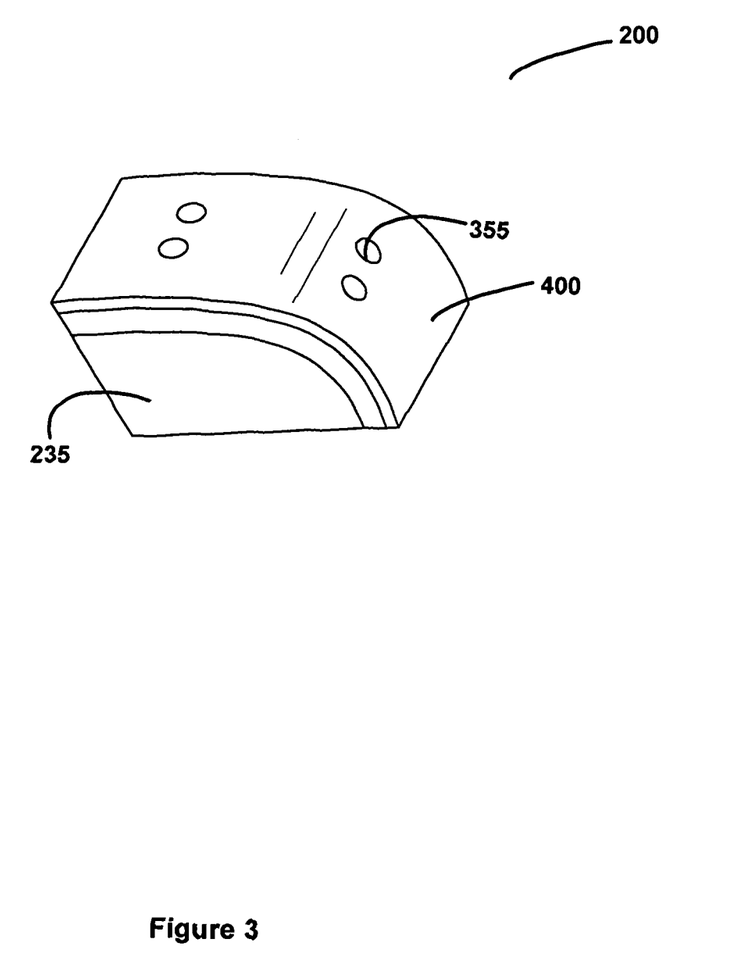
FIG. 3 depicts a finger of the end-effector according to various embodiments.

As the end-effector 200 is positioned near the object 365 the sensing distance may be focused closer with higher precision. The manipulator 105 may trace the surface of the object 365 prior to making contact. The controller 260 may determine the best place to make contact. For instance, the controller 260 may take balance, dimensions of the object 365, and designated target locations into account prior to selecting a place to make contact. Once initial contact is made with the object 365, additional surface sensors 400 may activate alerting the system 100 that contact has been made. With reference to FIGS. 2A, 2B and 3, the proximity sensors 350 may continue to operate through the through-hole 355 and the channel 356 after initial contact is made with the object 365. For instance, a light emitter and a reflection sensor of the sensor 350 may be housed separately or collocated in the same through-hole 355 and the channel 356. The contacting surface 405 of the fingers 220, and/or a portion of the surface of the fingers 220 may move normal to the applied force. The proximity sensors 350 may detect this compression and movement of the contacted object 365 closer to the sensors 350. A force calculation may be made based on this distance calculation. When the manipulator 105 is not in contact with the object 365, the distance from the sensor 350 through the channel 356 to the contact surface is a known value. As the distance 375 is reduced from the surface to the sensor 350, the amount of force applied to the object 365 is also a known scaled value. As force is reduced, the contact surface returns to its previous position when no contact is being made and the distance 370 between the sensor 350 and the object 365 through the channel 356 increases.

Those of ordinary skill will appreciate that although elements of the system 100 have been disclosed with regard to the end-effector 200, such as the operation of force sensing sensors 350, this operation may be applicable to any portion of the system 100 such as a manipulator arm 220 and/or a base 110. Further these disclosures may be relevant to the torso or platform of an associated robot. For instance, it is often desirable/necessary for a manipulator 105 when advancing towards an object to brush past or around obstacles. These obstacles may be contacted with a slight amount of force without detriment, however exceeding a threshold of force may result in unwanted occurrences. Thus, a deformable contact surface with an embedded sensor 350 for sensing force may be located in any portion of the manipulator 105, such as on the forearm of the manipulator 105.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The computational steps disclosed herein may be comprised in an article of manufacture including a non-transitory, tangible computer readable storage medium having instructions stored thereon.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, an object to be grasped and/or targeted is disclosed, persons of ordinary skill in the art, shall understand that grasping, targeting, investigating, and/or sensing, of any structure, object, system, apparatus, is contemplated by the system.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A system comprising:
a manipulator including an arm having a distal end and a proximal end and an end-effector coupled to the distal end of the arm, the end-effector having at least two fingers and a contact surface defining a channel, the contact surface being configured to compress as force is applied to an object by the end-effector;
an optical proximity sensor positioned on the end-effector and in the channel such that the optical proximity sensor senses a distance to the object through the channel in response to the object entering a predetermined range of the optical proximity sensor; and
a processor configured to determine an amount of force applied to the object by the end-effector based on the sensed distance from the optical proximity sensor to the object when the contact surface is compressed.

2. The system of claim 1, wherein the arm further comprises proximity sensors configured to aid in movement of the manipulator.

3. The system of claim 1, wherein the arm further comprises an arm segment configured to flex and rotate.

4. The system of claim 1, further comprising a tactile sensor coupled to the end-effector.

5. The system of claim 1, wherein the optical proximity sensor is further configured to sense surface features of the object and the at least two fingers may be configured to mirror a portion of the sensed surface features of the object at a dynamically adjusted range.

6. The system of claim 1, wherein a single light source generator of the optical proximity sensor may comprise a plurality of receivers.

7. The system of claim 1, wherein the optical proximity sensor is further configured to sense surface features of the object and the end-effector and the at least two fingers may be configured to be positioned in a desired shape and orientation based on the sensed surface features of the object.

8. The system of claim 1, wherein the processor is further configured to determine the optimal position of the end-effector for making contact with the object based on data sensed by the optical proximity sensor.

9. The system of claim 1, wherein the manipulator is coupled to a vehicle.

10. The system of claim 1, wherein a direction of sensing of the optical proximity sensor is configured to sweep in a desired range of angles from a surface of the manipulator.

11. The system of claim 1, wherein a range of the optical proximity sensor is dynamically adjusted to a dynamically scalable range.

12. The system of claim 1, wherein a direction of sensing of the optical proximity sensor is configured to be held steady independent of motion of the manipulator.

13. The system of claim 1, further comprising a second optical proximity sensor positioned on at least one of a palm, a wrist, a backhand, a fingertip or one of the at least two fingers of the end-effector.

14. A method comprising:
   providing a manipulator including an end effector having a contact surface that defines a channel;
   sensing, by an optical proximity sensor positioned within the channel, a distance to an object;
   applying pressure to the contact surface in order to compress the contact surface; and
   determining, by a processor, an amount of force applied to the object by the manipulator in response to contact with the object based on the sensed distance from the optical proximity sensor to the object when the contact surface is compressed.

15. A system comprising:
   an end-effector having an optical proximity sensor positioned in a channel defined by a contact surface of the end-effector that is configured to compress as force is applied to the object, the optical proximity sensor being configured to sense a distance to an object through the channel; and
   a processor configured to determine a scaled range of force measurements of force applied to the object subsequent to contact with the object based on the sensed distance to the object when the contact surface is compressed.

16. A system comprising:
   a manipulator including an arm having a distal end and a proximal end and an end-effector coupled to the distal end of the arm and having at least two fingers and an optical proximity sensor configured to sense in a dynamically positioned direction independent from the movement of the manipulator and to sense the distance to an object in response to the object entering a predetermined range of the optical proximity sensor; and
   a processor configured to determine an amount of force applied to the object by the end-effector in response to contact with the object.

\* \* \* \* \*